(12) United States Patent
Peixoto Guimaraes Ubirajara E Silva

(10) Patent No.: US 11,017,645 B2
(45) Date of Patent: May 25, 2021

(54) PRESENCE CONTROL METHOD AND MONITORING SYSTEM

(71) Applicant: SOMFY ACTIVITES SA, Cluses (FR)

(72) Inventor: Gabriel Peixoto Guimaraes Ubirajara E Silva, Belo Horizonte MG (BR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 16/473,553

(22) PCT Filed: Nov. 23, 2017

(86) PCT No.: PCT/FR2017/053232
§ 371 (c)(1),
(2) Date: Jun. 25, 2019

(87) PCT Pub. No.: WO2018/122479
PCT Pub. Date: Jul. 5, 2018

(65) Prior Publication Data
US 2019/0333351 A1    Oct. 31, 2019

(30) Foreign Application Priority Data

Dec. 27, 2016 (FR) ...................... 16/63404

(51) Int. Cl.
*G08B 13/196* (2006.01)
*H04L 29/08* (2006.01)
(52) U.S. Cl.
CPC . *G08B 13/19606* (2013.01); *G08B 13/19604* (2013.01); *G08B 13/19673* (2013.01); *G08B 13/19691* (2013.01); *H04L 67/24* (2013.01)
(58) Field of Classification Search
CPC .......... A61B 2017/00199; A61B 2017/00221; A61B 90/98; A61B 34/25;
(Continued)

(56) References Cited

U.S. PATENT DOCUMENTS 8,942,992 B1 * 1/2015 Zhu ................. G06Q 30/0238
705/14.38
2006/0027677 A1 * 2/2006 Abts .................... A01G 25/092
239/67
(Continued)

FOREIGN PATENT DOCUMENTS

EP    3098792 A1    11/2016

OTHER PUBLICATIONS

International Search Report for Application No. PCT/FR2017/053232.
Written Opinion for Application No. PCT/FR2017/053232.

*Primary Examiner* — David N Werner
*Assistant Examiner* — Kehinde Abimbola
(74) *Attorney, Agent, or Firm* — Cantor Colburn LLP

(57) ABSTRACT

Method for monitoring for presence in a surveillance zone (ZS) using a surveillance system (SY), comprising the following steps: detecting an absence of movement or of at least one movement of at least one entity (E1, E2, En) in a detection zone (ZD); creating and/or modifying, in a memory of the surveillance device (Dl), a piece of movement information (IM); sending the movement information (IM) using the surveillance device (Dl) to a processing unit (UT) of the surveillance system (SY); detecting an absence or a presence of at least one terminal (T1, T2, T3, Tn) in a communication network (RI); creating and/or modifying, in a memory of a listening module (ME), a piece of presence information (IP); and sending the piece of presence information (IP), using the listening module (ME), to the processing unit (UT).

20 Claims, 2 Drawing Sheets

(58) Field of Classification Search
CPC .......... A61B 17/07207; A61B 17/1155; A61B 17/1285; A61B 2017/00017; A61B 2017/00022; G06K 7/1413; G06K 19/06028; G06K 19/0723; G06K 19/00749; G06K 2007/10524; G06K 7/10297; G06K 7/10316; G06K 7/1066; G06K 7/10762; G08B 13/19606; G08B 13/19604; G08B 13/19691; G08B 13/19673; H04L 67/24
See application file for complete search history.

(56) References Cited

U.S. PATENT DOCUMENTS

| | | | |
|---|---|---|---|
| 2007/0159304 A1* | 7/2007 | Agarwal | G06K 7/0008 340/10.32 |
| 2010/0002151 A1* | 1/2010 | Pan | G06F 3/147 348/744 |
| 2011/0051641 A1* | 3/2011 | Pan | H04Q 9/00 370/311 |
| 2012/0058725 A1* | 3/2012 | Pan | G06F 3/147 455/41.2 |
| 2012/0092502 A1 | 4/2012 | Knasel et al. | |
| 2012/0291075 A1* | 11/2012 | Pan | H04N 9/3173 725/81 |
| 2013/0157652 A1* | 6/2013 | Khaitan | H04W 84/045 455/422.1 |
| 2014/0276229 A1* | 9/2014 | Ikeda | A61B 5/7282 600/586 |
| 2015/0281807 A1* | 10/2015 | Pan | H04Q 9/00 340/870.02 |
| 2015/0327043 A1* | 11/2015 | Das | H04W 64/003 455/418 |
| 2016/0320296 A1* | 11/2016 | Asano | G01J 5/0022 |

* cited by examiner

PRESENCE CONTROL METHOD AND MONITORING SYSTEM

FIELD OF THE INVENTION

The present invention concerns a system for monitoring a building as well as a method for controlling presence in the building monitoring area.

PRIOR ART

It is known to have an alarm system allowing to detect a malicious instruction in a building. The setting up of such a system may however prove to be complex because sensors and a central monitoring unit are to be positioned and configured.

Such an alarm system may also appear to be complicated to manage on a daily basis, because the persons authorized to enter the building are indifferently detected by the alarm system and must thereafter proceed to a neutralization of the alarm system.

The present invention aims to solve all or part of the aforementioned disadvantages.

DISCLOSURE OF THE INVENTION

To this end, the present invention concerns a method for controlling presence in a monitoring area by a monitoring system comprising the following steps:
  detecting an absence of movement or at least one movement of at least one entity in a detection area of the monitoring area by a monitoring device of the monitoring system,
  creating and/or modifying, in a memory of the monitoring device, a movement information item related to the absence of movement or to the at least one movement of at least one entity detected during the step of detecting the absence of movement or the at least one movement,
  sending the movement information item by the monitoring device to a processing unit of the monitoring system,
  detecting by a listening module of the monitoring system an absence or a presence of at least one terminal in a communication network, the listening module being arranged to communicate with a router of the monitoring system and being provided with a packet analyzer configured to detect, in at least one data packet exchanged in the communication network and received from the router, said absence or presence of at least one terminal in the communication network, the communication network being extended in the monitoring area,
  creating and/or modifying a presence information item in a memory of the listening module, the presence information item being related to the absence or the presence of at least one terminal in the monitoring area detected during the step of detecting the absence or the presence of at least one terminal,
  sending the presence information item by the listening module to the processing unit,
  wherein the step of detecting at least one movement of at least one entity is followed by the step of detecting the absence and/or the presence of at least one terminal in the communication network.

This arrangement allows taking advantage of the extent of a previously existing network namely the communication network for the detecting the presence or the absence of a terminal in the monitoring area.

This internal communication network of the building is therefore used by the system for detecting the presence of a terminal in the monitoring area. An intrusion can therefore be detected by the monitoring system when there is no match between a movement detection and a terminal detection. In this case the monitoring system is capable of determining whether there is a risk of intrusion into the monitoring area.

Alternatively, the presence of a terminal in the monitoring area may be indicative that an expected person is in the monitoring area. This may allow reassuring users about the presence of an expected person.

The listening module or the monitoring device according to variant embodiments can communicate the movement information item or presence information item to the processing unit through the router or through another link.

It is also possible to check whether a new terminal can be detected in the communication network after the detection of a movement. For example, if the detection area is located in the proximity of an access door to the monitoring area, it is possible to detect whether a person that enters is a known person.

According to one aspect of the invention, the processing unit is arranged to connect to the communication network.

This arrangement allows having a processing unit present in the monitoring area.

Preferably, the processing unit is comprised in a distinct device present in the monitoring area or comprised in a terminal capable of connecting to the communication network.

Thus, it is not necessary that the router is connected to another communication network external to the monitoring area in order to implement the method.

According to another aspect of the invention, the processing unit is comprised in a server external to the communication network and the router is capable of connecting to the server.

This arrangement allows using a remote server, for example a server existing prior to the setting up of the monitoring area, for the interpretation of the presence information item and/or the movement information item.

The processing unit can be physically in the monitoring area or located at the external server in connection with the router or located at a terminal.

According to one aspect of the invention, the monitoring device and/or the listening module are arranged to be connected to the communication network.

Thus, the exchange between the processing unit on the one hand and the monitoring device and/or the listening module on the other hand can be performed directly in the communication network or via the router when the processing unit is comprised in the server.

According to another aspect of the invention, the listening module is comprised in the router.

This arrangement allows facilitating the detection performed by the listening module in the data packets exchanged in the communication network and received by the router. Indeed, the exchanged data packets are directly available to the listening module.

According to one aspect of the invention, the presence control method further comprises the following steps performed by the processing unit:
  receiving the presence information item and/or the movement information item,
  applying an association function to the presence information item and/or the movement information item, the application of the association function generating a matching information item, analyzing the matching information item according to at least one irregularity determination criterion.

This arrangement allows concentrating, at the processing unit, the information items related to the detected movements and to the detected terminals in the monitoring area.

The method therefore allows determining whether a movement is suspicious because without a terminal in the monitoring area or if the number of the detected movements is significant compared to the number of the detected terminals, an irregularity can be observed. Depending on the type of irregularity an alarm can thus be triggered or a user can be informed.

According to one aspect of the invention, the association function consists in establishing that a detected movement either corresponds or does not correspond to the presence of a determined terminal detected in the communication network.

This arrangement allows detecting which movements are not generated by a user having a determined terminal.

According to one aspect of the invention, the association function also consists in establishing either a match or a mismatch between a user profile previously referenced related to a terminal and a terminal whose presence is detected.

Thus, it is possible to determine which user is present in the monitoring area or whether a terminal not previously referenced related to a user profile is detected.

According to one aspect of the invention, an irregularity determination criterion corresponds to a detected movement not related to a user profile. Therefore, this movement is potentially an intrusion.

According to one aspect of the invention, another irregularity criterion corresponds to a detection of a terminal of a user whose profile is known while no corresponding movement has been detected for a determined duration.

An alert can thus be transmitted if a terminal is detected in the monitoring area without corresponding with a movement detection in the monitoring area for a determined duration. The user in question may have collapsed and be unable to leave the monitoring area.

According to one aspect of the invention, the presence control method further comprises a step of storing the presence information item and/or the movement information item in a memory of the processing unit.

This arrangement allows the processing unit to build up a history of movement information items and presence information items from the monitoring device.

According to one aspect of the invention, the movement information item is timestamped by the monitoring device and/or the presence information item is timestamped by the listening module.

This arrangement facilitates the application of the association function and the analysis of the matching information item according to an irregularity determination criterion.

According to one aspect of the invention, when the presence control method as described hereinabove is repeatedly executed, the steps of applying the association function and analyzing the matching piece(s) of information further take into account the presence piece(s) of information and/or the movement information items previously stored in a memory of the processing unit, particularly when these presence information items and/or movement information items are determined in a same time window.

According to one aspect of the invention, the step of detecting at least one movement of at least one entity is followed by the step of detecting the absence and/or the presence of at least one terminal in the communication network.

This arrangement allows checking whether a new terminal can be detected in the communication network after the detection of a movement. For example, if the detection area is located in the proximity of an access door to the monitoring area, it is possible to detect whether a person that enters is a known person.

According to one aspect of the invention, the step of detecting the absence and/or the presence of at least one terminal in the communication network is performed in a repetitive manner according to a determined frequency.

This arrangement allows, on the one hand, regularly returning a presence information item to the processing unit and, on the other hand, reducing the energy consumption of the monitoring device since the detection of an absence and/or a presence of at least one terminal is not performed continuously.

According to one aspect of the invention, the step of sending the presence information item is performed following the step of creating and/or modifying a presence information item in a memory of the monitoring device or upon request from the processing unit or according to a defined time base.

This arrangement allows returning the presence information item to the processing unit either as quickly as possible or in a regular manner. Thus, several modes of operation can be distinguished.

A first mode of operation called «deactivated alarm» is defined by a quasi-permanent movement detection, that is to say that the movement detection step is performed by an active movement detector (sleep periods of the movement detector can alternate with periods in which it is active), and correspond to a periodic detection of the presence information items. The transmission to the electronic processing unit is also performed according to a periodic basis: it is about providing the processing unit with a practical information item about the absences and presences in the monitoring area.

In this case, the monitoring system works economically since the monitoring device only connects to the communication network periodically according to a determined frequency.

A second mode of operation called «activated alarm» is defined by a quasi-permanent movement detection and a presence detection performed following the detection of a movement. The movement information item and the presence information item are thereafter immediately transferred to the processing unit. It is then about providing the processing unit with useful information item about the absences and presences in the monitoring area, in particular for the purpose of detecting intrusions.

In this case, as soon as a movement is detected, a check of the presence of terminals in the monitoring area is performed then these information items are returned to the processing unit. Thus, the step of detecting the absence and/or the presence of at least one terminal in the communication network can take place with a frequency higher than in the «deactivated alarm» mode if many movements are detected.

Of course, other modes of operation can be defined as variants of the two modes presented above, depending on the constraints of the information items feedback swiftness and the desired limitation of the energy consumption of the monitoring device.

According to one aspect of the invention, the presence information item further comprises an indication related to the solicitation of the terminal. Preferably, the indication related to the solicitation comprises a terminal activity and/or displacement indicator.

This arrangement allows returning any suspicious behavior to the processing unit, for example if a mobile has been unused for a long period. In this case an irregularity can be observed: the user may have collapsed and be unable to use his terminal.

According to one aspect of the invention, the presence control method further comprises a step of sending a feedback information item by the processing unit to a receiver terminal corresponding to a user profile referenced as a receiver in the memory of the processing unit, the feedback information item comprising an indication related to the movement information item and/or the presence information item and/or a result of the matching information item analysis according to the least one irregularity determination criterion.

This arrangement allows any user whose profile is referenced as a receiver to have a feedback information item concerning the monitoring of the building.

This arrangement is useful because the user may be away from the processing unit or even outside the monitoring area and be aware of the detected movements, the present terminals and/or the possible irregularities or alarms related to the monitoring area.

According to one aspect of the invention, the presence information item corresponds to a terminal other than the receiver terminal. This arrangement is particularly useful for a user referenced as a receiver who wishes to know the situation of other users. These other users will in particular be referenced with a transmitter profile, that is to say, whose absence or presence can be determined and transmitted to the listening module.

According to one aspect of the invention, the presence control method further comprises a step of receiving command and/or control information item by the processing unit from an administrator terminal corresponding to a user profile being referenced as an administrator in the memory of the processing unit, the command and/or control information item comprising:
a request related to the execution of a step of detecting an absence of movement or at least one movement of at least one entity and/or a step of detecting an absence and/or a presence of at least one terminal in a communication network, and/or,
a request related to the execution of a step of applying the association function and/or to the execution of a step of analyzing the matching information item, and/or,
a request related to the execution of a step of sending a feedback information item by the processing unit.

Thus, a user having a profile referenced in the processing unit as an administrator is capable of remotely controlling the conduct of the steps of the presence control method, in particular by defining the detection rates and by receiving more or less frequently feedback information items if that user is further referenced as a receiver.

This user can thus be warned of the detected irregularities which can be alarms. He may thus remotely react to these irregularities by indicating to the processing unit that they are not to be considered as irregularities.

It is thus possible to distinguish a terminal comprising a profile referenced as a transmitter as a «monitored» terminal and a terminal comprising a profile referenced as administrator and/or receiver as a «monitor» terminal. A non-referenced terminal may be considered as an intrusion indicator.

According to one aspect of the invention, the feedback information item and/or command and/or control information item transits via the router.

This arrangement allows a user having a terminal present in the monitoring area to take advantage of the communication network.

The present invention also concerns a monitoring system, arranged to implement the presence control method as described above, comprising:
a monitoring device capable of exchanging information items according to a communication protocol of the communication network,
the monitoring device comprising a communication module arranged to exchange information items according to the communication protocol and a movement detector provided with a sensor, the movement detector being configured to determine a movement information item related to the detection of a movement of an entity in a detection area of said sensor,
a listening module arranged to communicate with a router and provided with a packet analyzer configured to extract from at least one data packet exchanged in the communication network and received from the router a presence information item related to an absence or a presence of at least one terminal in the communication network,
a processing unit comprising a processor arranged to receive the presence information item from the listening module and the movement information item from the monitoring device.

According to one aspect of the invention, the processing unit is arranged to transmit a request to the listening module upon receiving a movement information item, said request corresponding to a solicitation for obtaining a presence information item.

This arrangement allows checking whether a terminal can be detected in the communication network after the detection of a movement. It is therefore possible to associate the detection of a movement with the presence of a known person if the terminal in question is a known terminal.

According to one aspect of the invention, the sensor of the movement detector comprising an infrared detector and/or a camera.

According to one aspect of the invention, the listening module is arranged to exchange information items with the processing unit. Preferably, the listening module is comprised in a central alarm unit that is arranged to manage an alarm system of the building.

This arrangement allows using an existing central alarm unit for detecting a presence information item.

According to one aspect of the invention, the monitoring device comprises a detection system capable of detecting a malicious intrusion into the building.

Preferably the detection system comprises a plurality of movement detectors. Particularly, the detection system comprises a plurality of independent elements, each movement detector being comprised in a corresponding independent element and the independent modules being arranged to exchange information items with a central entity of the detection system provided with a processor.

This arrangement allows detecting movements throughout the building.

According to one aspect of the invention, the detection system is arranged to establish an independent wired and/or wireless network for exchanging information items between the independent elements and the central entity.

The detection system is thus an independent system of the communication network, which allows an independent operation.

According to another aspect of the invention, the listening module is comprised in the monitoring device. This arrangement allows simply constituting a monitoring system in case there is no listening module already installed in the building. The setting up of a monitoring system is easy since it is sufficient to set up a monitoring device in the building equipped with an internet router.

According to one aspect of the invention, the processing unit is arranged to connect to the communication network.

This arrangement allows having a processing unit present in the monitoring area.

Preferably, the processing unit is comprised in a distinct device present in the monitoring area or comprised in a terminal capable of connecting to the communication network.

Thus, it is unnecessary that the router is connected to another communication network external to the monitoring area for implementing the method.

According to another aspect of the invention, the processing unit is comprised in a server external to the communication network and the router is capable of connecting to the server.

This arrangement allows using a remote server, for example a server existing prior to the setting up of the monitoring area, for the interpretation of the presence information item and/or the movement information item.

According to another aspect of the invention, the listening module is comprised in the router.

This arrangement allows facilitating the detection performed by the listening module in the data packets exchanged in the communication network and received by the router. Indeed, the exchanged data packets are directly available to the listening module.

The present invention further concerns a method for referencing a family account by a monitoring system in a memory of a processing unit of the monitoring system comprising the following steps:
- creating and/or modifying a family account comprising at least one user profile in a memory of the processing unit,
- assigning a reference as an administrator and/or a receiver to the at least one user account by the processing unit, an administrator being capable of sending a command and/or control information item to the processing unit, a receiver being capable of receiving feedback information item from the processing unit,
- establishing a local communication network by a monitoring device and/or a listening module of the monitoring system,
- receiving via the local communication network by the monitoring device and/or the listening module a reference of access to a communication network of the monitoring system extended in a monitoring area at the monitoring device and/or the listening module,
- connecting the monitoring device and/or the listening module to the extended communication network using the access reference.

This arrangement allows on the one hand determining the authorizations of the different users and on the other hand connecting the monitoring device and/or the listening module to the monitoring system.

Thus, the communication network of the monitoring system can be a pre-existing network of a building. The monitoring area then corresponds to the range of the communication network of the building.

This arrangement therefore allows defining an extended monitoring area without additional equipment for establishing a network. The local communication network of the monitoring device and/or the listening module can thus have a short-range compared to the communication network of the monitoring area.

According to one aspect of the invention, the step of creating and/or modifying a family account and/or the step of assigning a reference is performed by input at an interface of the processing unit.

According to one aspect of the invention, the processing unit interface is a remote interface. Preferably, the interface of the processing unit is formed in the terminal, the terminal and the processing unit being capable of exchanging information items.

According to one aspect of the invention, the step of receiving an access reference is preceded by a step consisting in scanning a pattern such as a barcode with a terminal comprising a communication module capable of connecting to said local communication network and, the pattern corresponding to an identification of the monitoring device and/or the listening module.

This arrangement allows a quick connection of the monitoring device and/or the listening module to the communication network of the monitoring area.

The identification of the monitoring device and/or the listening module acquired by the terminal provided with a camera allows transferring this identification to the router and/or the processing unit which authorizes the connection by sending an access reference to the monitoring device and/or the listening module.

Thus, it appears that the monitoring device and/or the listening module act as a router, in particular for the configuration and the first identification of the terminals.

Thereafter, once the monitoring device and/or the listening module are part of the communication network, they are capable of communicating with the processing unit according to the presence control method as described above.

According to one aspect of the invention, the communication network and/or the local communication network are networks of the Wi-Fi type or using another technology, such as LoRa or Sigfox technology.

According to one aspect of the invention, the external communication network is an Internet or a 3G type network or any other type of extended network.

According to one aspect of the invention, the steps of the referencing method are steps prior to the steps of the presence control method as described above.

The different aspects defined hereinabove that are not incompatible can be combined.

BRIEF DESCRIPTION OF THE FIGURES

The invention will be better understood using the detailed description which is disclosed hereinbelow with reference to the appended drawing in which.

DESCRIPTION WITH REFERENCE TO THE FIGURES

In the following detailed description of the figures defined hereinabove, the same elements or elements fulfilling identical functions may keep the same references so as to simplify the understanding of the invention.

Monitoring System

Figure 1:
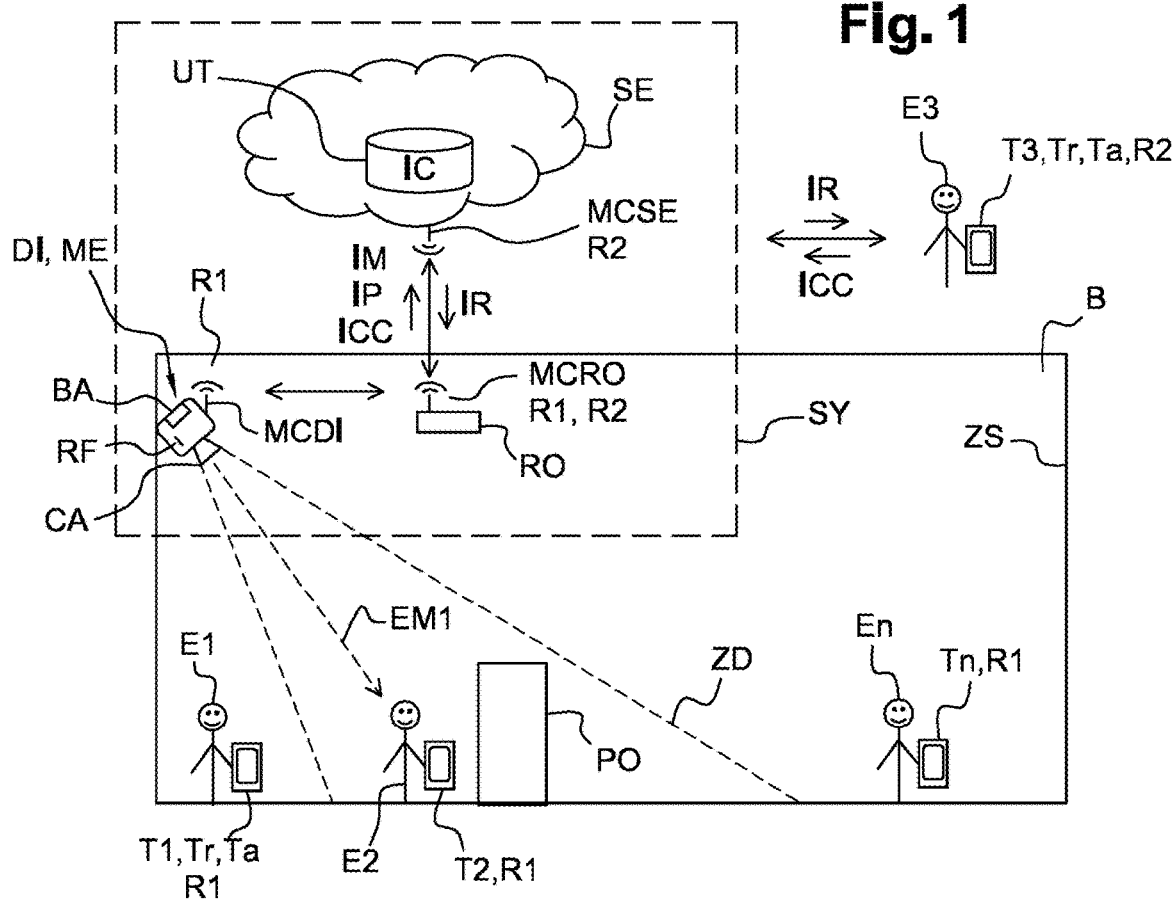
FIG. 1 is a schematic view of a building and a monitoring system.

As illustrated in FIG. 1, a monitoring system SY for a monitoring area ZS of a building B comprises a monitoring device Dl.

The monitoring device Dl comprises a communication module MCDl allowing it to exchange information items according to a communication protocol of the monitoring system SY.

The monitoring device Dl also comprises a battery BA and a movement detector CA configured to determine a movement information item IM.

The movement detector CA comprises a sensor, for example provided with an infrared detector and/or a camera.

The movement information item IM is related to a detection of an absence of movement or at least one movement of at least one entity E1, E2, En in a detection area ZD of the monitoring area SZ.

The monitoring system SY further comprises a listening module ME provided with a packet analyzer configured to extract a presence information item IP from a data packet exchanged in a communication network R1. The presence information item IP is related to an absence or a presence of at least one terminal T1, T2, T3, Tn in the communication network R1.

The monitoring system SY also comprises a processing unit UT. In the presented embodiment, the processing unit UT is comprised in a server SE. It can, however, be physically comprised in the monitoring area ZS, associated for example with the monitoring device Dl or a casing of a central alarm unit. It could also be located at a terminal T1, T2, T3, Tn or any other device capable of being connected to the communication network R1.

The server SE is remote and comprises a communication module MCSE for allowing a connection of the processing unit UT to an external communication network R2, for example Internet.

The processing unit UT is provided with a processor and is arranged to receive IP presence information items from the listening module ME and movement information items IM from the monitoring device Dl.

Figure 2:
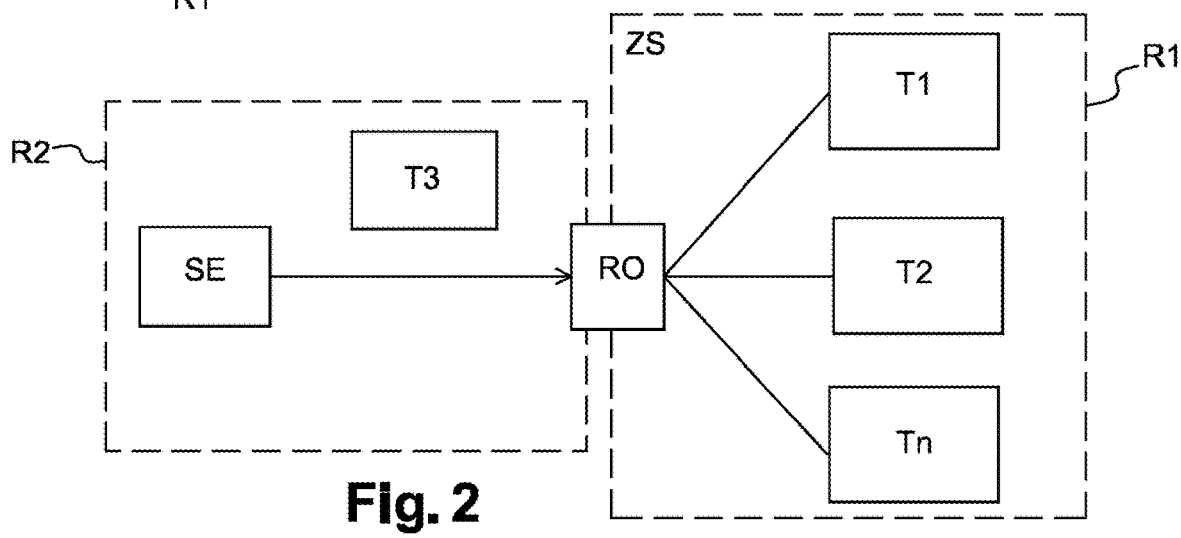
FIG. 2 is a diagram showing a router of the monitoring system capable of communicating an external communication network with a communication network of the monitoring system.

As illustrated in FIG. 2, the monitoring system SY comprises a router RO capable of transmitting information items between the communication network R1 and the external communication network R2. Particularly, the router RO connects the monitoring system SY to the server SE, which is external to the communication network R1.

The listening module ME can be comprised in a casing of a central alarm unit CE which is arranged to manage an alarm system of the building B. In this case, it is possible to use the listening module ME of the alarm system previously installed in the building and to constitute a monitoring system SY by adding a monitoring device Dl. Alternatively, the listening module ME can be comprised in the router RO.

In the present exemplary embodiment, the listening module ME is comprised in the monitoring device Dl. Thus, it appears that the exchange of information items between the router RO and the listening module is performed by using the communication module MCDl.

Each entity E1, E2, E3, En corresponds to a user as symbolized in FIG. 1. Each user has a terminal T1, T2, T3, Tn arranged to exchange information items in the communication network R1 and in the external communication network R2. Each terminal T1, T2, T3, Tn comprises a communication module and a human-machine interface. The information items provided by the processing unit UT may in particular be displayed by this interface.

It is for example a phone capable of connecting to a Wi-Fi network corresponding to the communication network R1 and to a 3G network corresponding to the external communication network R2.

As will be detailed later on, it will appear that each referenced terminal T1, T2, T3, Tn is a terminal called «monitored» by the monitoring system SY.

According to one variant, the monitoring device may comprise a detection system provided with a plurality of movement detectors CA and a plurality of independent elements, each movement detector CA being formed in a corresponding independent element.

In this case the detection system comprises a central entity provided with a processor, the system being capable of generating an independent wired and/or wireless network so that the central entity can exchange information items with each movement detector CA of the plurality of movement detectors CA.

It is thus possible to monitor the intrusions into the entire building by detecting movements in each room.

Method for Referencing a Family Account

Figure 3:
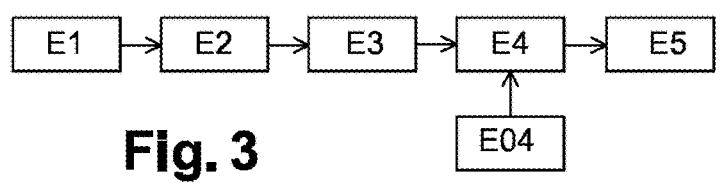
FIG. 3 is a diagram showing the steps of a method for referencing a family account for using the monitoring system.

As illustrated in FIG. 3, a method for referencing a family account relates to referencing each terminal T1, T2, T3, Tn of the family members.

The referencing method is carried out by the monitoring system SY for the purpose of performing a referencing of the terminals T1, T2, T3, Tn of the family in a memory of the processing unit UT.

A first step E1 consists in creating and/or modifying a family account comprising at least one user profile via the interface of a terminal, for example the terminal T1. A user profile can be associated with each terminal T1, T2, T3, Tn.

The user profiles associated with each terminal T1, T2, T3, Tn are stored in a memory at the processing unit UT and/or the server SE. The input operations for creating and/or modifying a family account can be performed by using the interface of the terminal T1 which acts as a remote interface of the processing unit UT. This creation and/or modification step can for example be performed thanks to a software application installed on the terminal T1. A second step E2 consists in assigning a reference as the administrator terminal Ta and/or the receiver terminal Tr of at least one terminal T1, T3 corresponding to a user profile of a family account.

An administrator is capable of sending command and/or control information item ICC to the processing unit UT and a receiver is capable of receiving a feedback information item IR from the processing unit UT.

In the example shown in FIG. 1, the terminals T1 and T3 have been defined as administrator terminals Ta, in other words they are terminals T1, T3 qualified as «monitors». The terminal T2 is associated with a transmitter profile.

At the end of these steps E1 and E2, it therefore appears that the terminals T1, T2, T3, Tn can be qualified as «monitored» and that the terminals T1 and T3 are «monitors».

A «monitor» terminal capable of receiving a feedback information item IR but not configured to transmit command and/or control information item ICC corresponds to a receiver profile. This terminal could not modify settings of the processing unit UT, unlike an administrator.

A third step E3 consists in temporarily establishing a local communication network R3 for connecting the monitoring device Dl and/or the listening module ME to the communication network R1 and optionally the configuration of the profiles of the terminals.

Figure 4:
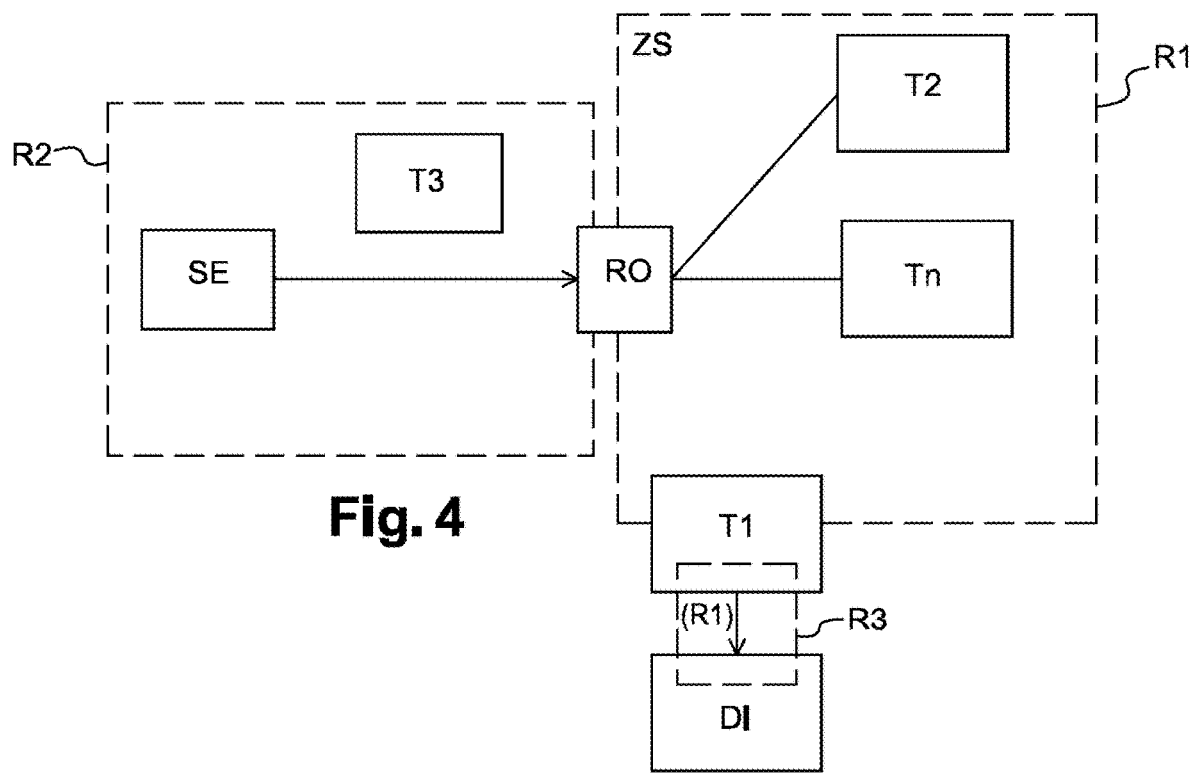
FIG. 4 is a diagram similar to that of FIG. 2 and further comprising a local communication network used for the referencing method.

As illustrated in FIG. 4, the monitoring device Dl establishes the local communication network R3. In the presented embodiment, the listening module ME is comprised in the monitoring device Dl.

A fourth step E4 consists in receiving by the monitoring device Dl and/or the listening module ME a reference of access RF to the communication network R1.

This step E4 is preceded by a step E04 consisting in scanning a pattern such as a barcode with the terminal T1, the pattern corresponding to an identification of the monitoring device Dl and/or the listening module ME.

The identification of the monitoring device Dl and/or the listening module ME by the terminal T1 provided with a camera allows transferring this identification to the router RO and/or the processing unit UT which authorizes connection by sending the access reference RF to the monitoring device Dl and/or the listening module ME in the communication network R1.

A step E5 following the reception step E4 consists in connecting the monitoring device Dl to the communication network R1 thanks to the access reference RF.

This referencing method therefore allows defining which are the «monitored» terminals and the «monitor» terminals and also easily allows connecting the monitoring device Dl and/or the listening module ME to the communication network R1.

Of course, after executing this referencing method, it is possible to modify authorizations of the referenced terminals T1, T2, T3, Tn from an administrator terminal Ta.

Presence Control Method

Figure 5:
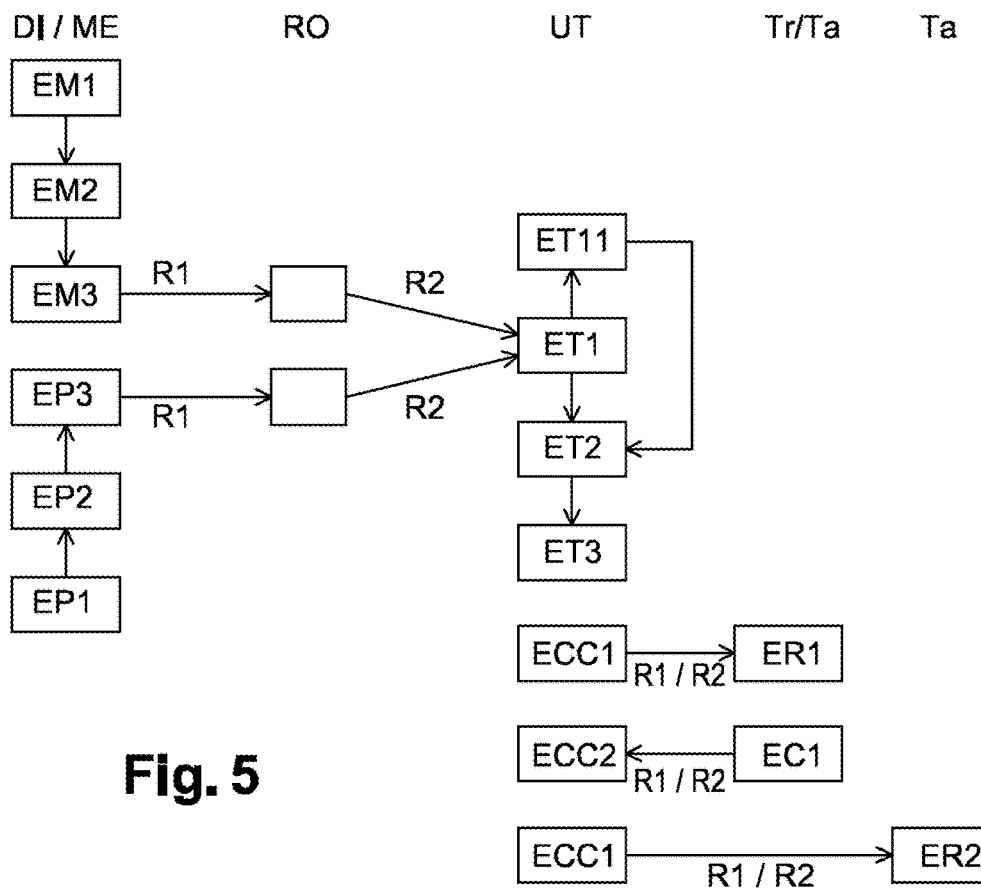
FIG. 5 is a diagram showing the steps of a method for controlling the presence by the monitoring system.

As illustrated in FIG. 5, a method for controlling presence in a monitoring area ZS is executed by a monitoring system SY for determining a risk of intrusion of an ill-intentioned person in the monitoring area ZS.

The presence control method comprises a step EM1 of detecting an absence of movement or at least one movement in a detection area ZD of the monitoring area ZS. This stage EM1 is performed by the monitoring device Dl using its movement detector CA.

The presence control method thereafter comprises a step EM2 for creating and/or modifying a movement information item IM in a memory of the monitoring device Dl, this information item being timestamped by the monitoring device Dl. The movement information item IM reports the absence of movement or one or more movements of entities E1, E2, E3, En detected.

A step EP1 consists in detecting an absence or a presence of at least one terminal T1, T2, Tn in the communication network R1 as illustrated in FIG. 1.

This detection is performed by means of the router RO and consists in searching for terminals T1, T2, Tn in at least one data packet exchanged within the communication network R1. The router RO provides a data packet exchanged within the communication network R1 to the listening module ME.

The communication network R1 is the network generated by the router RO and it is extended in the monitoring area ZS. This is for example a Wi-Fi network, in particular a local and secure network.

A step EP2 thereafter consists in creating and/or modifying a presence information item IP in a memory of the listening module ME, the presence information item IP being related to the absence or the presence of at least one terminal T1, T2, Tn in the communication network R1.

The presence information item IP is timestamped by the listening module ME and may further comprise an indication related to the solicitation of a detected terminal, for example T1.

This is for example an indicator of activity or inactivity of the terminal T1 on the communication network R1, related to the fact that the terminal T1 has been used recently and/or a displacement indicator from a measurement of the terminal T1 proving the displacement of the terminal T1 (for example an information item from a global positioning system (GPS) of the terminal T1).

The similarity between the steps EM1, EM2 on the one hand and EP1, EP2 on the other hand then appears: the presence of an entity E1, E2, En is detected and the presence of a terminal T1, T2, T3 is also detected.

The presence control method comprises a step EM3 consisting in sending the movement information item IM by the monitoring device Dl to the processing unit UT.

In the presented embodiment, the transmission of the movement information item IM is performed via the router RO. Nevertheless, other communication links can be alternatively set up.

A step EP3 consists in sending the presence information item IP by the listening module ME, that is to say in the embodiment presented by the monitoring device Dl, to the processing unit UT.

As for the movement information item IM, in the presented embodiment, the transmission of the presence information item IP is performed via the router RO. Nevertheless, other communication links can be alternatively set up.

The movement detector CA is in a quasi-permanent operation (in other words, sleep periods of the movement detector can alternate with periods in which it is active, but a movement is detected instantaneously to the human scale), that is to say the steps EM1 and EM2 are performed quasi-continuously. According to the sequence of steps of the presence control method detailed above, several modes of operation are to be distinguished.

The detection step EP1 is performed after detecting an entity E2 during the step EM1 in an operating mode called «activated alarm».

The step EP3 for sending the presence information item IP is in the «activated alarm» mode performed following the step EP2 of creating and/or modifying the presence information item IP, the sending step EM3 being performed at the same time as step EP3.

In the «activated alarm» operating mode, it therefore appears that the movement detection is permanent and that the presence detection is performed each time a movement is detected, the movement information items IM and the presence information items IP being thereafter transferred to the processing unit UT.

This operating mode is the fastest way for returning presence information items IP and movement information items IM to the processing unit UT.

Alternatively, this sending step EP3 may be subordinated to receiving, by the listening module ME, a corresponding request transmitted by the processing unit UT. The step EP3 can also be performed according to a defined time base.

The choice of this setting depends on the need to have a recent presence information item IP for the processing unit UT and also depends on the limitation of the energy consumption of the battery BA of the monitoring device Dl.

According to an operating mode called «deactivated alarm», the sending step EP3 is performed according to a defined time base, the purpose being to limit the energy consumption of the monitoring device Dl. In this case, the sending step EM3 is performed at the same time as the sending step EP3.

It therefore appears according to this embodiment that the monitoring device Dl collects a set of movement information items IM and a set of presence information items IP but sends these information items according to the defined time base.

The detection step EP1 can also be performed in a repetitive manner according to a determined frequency for a reduced energy consumption in the «deactivated alarm» operating mode.

A step ET1 thereafter consists in receiving the presence information item IP and/or the movement information item IM by the processing unit, via the router RO in the presented embodiment.

A step ET11 of storing in a memory of the processing unit UT the received IP and/or information items IM can thereafter be performed. This arrangement allows building up a history of the presence information items IP and/or the movement information items IM, since the latter are time stamped.

A step ET2 of applying an association function to the presence information item IP and/or the movement information item IM is thereafter performed by the processing unit UT.

The application of the association function has the purpose of generating a matching information item IC related to the match or the mismatch between a user profile previously referenced related to a terminal T2 and a terminal T2 whose presence is detected.

Thus, the association function allows determining that a detected movement either corresponds or does not correspond to the presence of a previously referenced terminal T2. It is therefore possible to detect any movement that does not correspond to a movement of a user having his referenced terminal with him.

Thereafter, a step ET3 consists in analyzing the matching information item IC by the processing unit UT for the purpose of obtaining a result related to a potential intrusion into the monitoring area ZS.

The analysis is performed according to an irregularity determination criterion, having the purpose of triggering an alarm and/or warning a receiver terminal Tr of the irregularity.

The irregularity determination criterion may correspond to a detected movement not related to a user profile, that is to say a potential intrusion.

It can also be the detection of a known terminal without a corresponding movement for a determined duration. In this case the irregularity may correspond to a collapse of the user of the terminal in question or an inability to leave the monitoring area ZS.

The step ET2 of applying the association function and the step ET3 of analyzing the matching information items IC can be performed repeatedly, the movement information items IM and/or the presence information item IP previously stored in a memory of the processing unit UT in step ET11 being then taken into account.

It therefore appears that the processing unit UT allows gathering the presence information items IP and the movement information items IM at the processing unit UT for determining any potential intrusion or irregularity within the monitoring area ZS.

The step ECC1 consists in sending a feedback information item IR by the processing unit UT to a receiver Tr or administrator Ta terminal. This sending can be performed via the router RO when the receiver Tr or administrator Ta terminal is connected to the communication network R1 or via the external communication network R2 when the receiver Tr or administrator Ta terminal is outside the monitoring area ZS.

The feedback information item IR comprises an indication related to the movement information item IM and/or the presence information item IP and/or a result of the matching information item IC analysis.

The terminal Tr thus performs a step of receiving ER1, ER2 this feedback information item IR as illustrated in FIG. 5.

Similarly, an administrator terminal Ta is able to generate a command and/or control information item ICC and send it to the processing unit UT during a step EC1.

A step ECC2 of receiving command and/or control information item is thereafter performed by the processing unit UT either via the router RO when the administrator terminal Ta is connected to the communication network R1 or via the external communication network R2.

The command and/or control information item ICC may comprise:
 a request related to the execution of a step of detecting EM1 an absence of movement or at least one movement of at least one entity E1, E2, En and/or a step of detecting EP1 an absence and/or a presence of at least one terminal T1, T2, T3, Tn in a communication network R1, and/or,
 a request related to the execution of a step of applying the association function and/or to the execution of a step of analyzing ET3 the matching information item IC, and/or,
 a request related to the execution of a step of sending ECC1 a feedback information item IR by the processing unit UT.

It therefore appears that the processing unit UT of the monitoring system SY centralizes the presence information items IP and movement information items IM to deduce irregularities therefrom and notify receivers and/or administrators thereof.

It goes without saying that the invention is not limited to the sole embodiment described hereinabove as an example, it encompasses on the contrary all variants thereof.

The invention claimed is:
1. A method for controlling presence in a monitoring area of a building by a monitoring system comprising the following steps:
 (EM1) detecting an absence of movement or at least one movement of at least one entity in a detection area of the monitoring area of the building by a monitoring device of the monitoring system, (EM2) creating and/or modifying in a memory of the monitoring device a movement information item related to the absence of movement or to the at least one movement of at least one entity detected during the step of detecting (EM1) the absence of movement or the at least one movement, (EM3) sending the movement information item by the monitoring device to a processing unit of the monitoring system, (EP1) detecting by a listening module of the monitoring system an absence or a presence of at least one terminal in a communication network of the building, the listening module being arranged to communicate with a router of the monitoring system and being provided with a packet analyzer configured to detect in at least one data packet exchanged in the communication network of the building and received from the router said absence or presence of at least one terminal in the communication network of the building, the communication network of the building being extended in the monitoring area of the building, (EP2) creating and/or modifying a presence information item in a memory of the listening module, the presence information item being related to the absence or the presence of at least one terminal in the monitoring area of the building detected during the step (EP1) of detecting the absence or the presence of at least one terminal, (EP3) sending the presence information item by the listening module to the processing unit, wherein the step (EM1) of detecting at least one movement of at least one entity is followed by the step (EP1) of detecting the absence and/or the presence of at least one terminal in the communication network of the building, wherein the monitoring system determines if an intrusion in the building is detected in the detection area when there is no match between a movement information item and a presence information item.

2. The presence control method according to claim 1, further comprising the following steps performed by the processing unit:

(ET1) receiving the presence information item and/or the movement information item, (ET2) applying an association function to the presence information item and/or the movement information item, the application of the association function generating a matching information item, (ET3) analyzing the matching information item according to at least one irregularity determination criterion.

3. The presence control method according to claim 2, wherein the association function consists in establishing that a detected movement either corresponds or does not correspond to the presence of a determined terminal detected in the communication network.

4. The presence control method according to claim 2, further comprising a step (ET11) of storing the presence information item and/or the movement information item in a memory of the processing unit.

5. The presence control method according to claim 1, wherein the movement information item is timestamped by the monitoring device and/or wherein the presence information item is timestamped by the listening module.

6. The presence control method according to claim 1, wherein the step (EP1) for detecting the absence and/or the presence of at least one terminal in the communication network is performed in a repetitive manner according to a determined frequency.

7. The presence control method according to claim 1, wherein the step of sending (EP3) the presence information item is performed following the step (EP2) of creating and/or modifying a presence information item in a memory of the monitoring device or upon request from the processing unit or according to a defined time base.

8. The presence control method according to claim 2, further comprising a step (ECC1) of sending a feedback information item by the processing unit to a receiver terminal corresponding to a user profile referenced as a receiver in the memory of the processing unit, the feedback information item comprising an indication related to the movement information item and/or the presence information item and/or a result of the matching information item analysis according to the at least one irregularity determination criterion.

9. The presence control method according to claim 8, further comprising a step (ECC2) of receiving command and/or control information item by the processing unit from an administrator terminal corresponding to a user profile being referenced as an administrator in the memory of the processing unit, the command and/or control information item comprising:

a request related to the execution of a step of detecting (EM1) an absence of movement or at least one movement of at least one entity and/or a step of detecting (EP1) an absence and/or a presence of at least one terminal in a communication network, and/or, a request related to the execution of a step (ET2) of applying the association function and/or to the execution of a step of analyzing (ET3) the matching information item, and or, a request related to the execution of a step of sending (ECC1) a feedback information item by the processing unit.

10. The presence control method according to claim 8, wherein the feedback information item and/or command and/or control information item transits via the router.

11. A monitoring system arranged to implement the presence control method according to claim 1, comprising:

a monitoring device capable of exchanging information items according to a communication protocol on the communication network, the monitoring device comprising a communication module arranged to exchange information items according to the communication protocol and a movement detector provided with a sensor, the movement detector being configured to determine a movement information item related to the detection of a movement of an entity in a detection area of said sensor, a listening module arranged to communicate with a router and provided with a packet analyzer configured to extract from at least one data packet exchanged in the communication network and received from the router a presence information item related to an absence or a presence of at least one terminal in the communication network, a processing unit comprising a processor arranged to receive the presence information item from the listening module and the movement information item from the monitoring device.

12. The monitoring system according to claim 11, wherein the processing unit is arranged to transmit a request to the listening module upon receiving a movement information item, said request corresponding to a demand for obtaining a presence information item.

13. A method for referencing a family account by a monitoring system in a memory of a processing unit of the monitoring system according to claim 11 comprising the following steps:
(E1) creating and/or modifying a family account comprising at least one user profile in a memory of the processing unit,
(E2) assigning a reference as an administrator and/or a receiver to the at least one user profile by the processing unit, an administrator being capable of sending command and/or control information item to the processing unit, a receiver being capable of receiving feedback information item from the processing unit,
(E3) establishing a local communication network by a monitoring device and/or a listening module of the monitoring system,
(E4) receiving via the local communication network by the monitoring device and/or the listening module a reference of access to a communication network of the monitoring system extended in a monitoring area at the monitoring device and/or the listening module,
(E5) connecting the monitoring device and/or the listening module to the extended communication network using the access reference.

14. The referencing method according to claim 13, wherein the step (E4) of receiving an access reference is preceded by a step (E04) consisting in scanning a pattern such as a barcode with a terminal comprising a communication module capable of connecting to said local communication network, the pattern corresponding to an identification of the monitoring device and/or the listening module.

15. The presence control method according to claim 3, further comprising a step (ET11) of storing the presence information item and/or the movement information item in a memory of the processing unit.

16. The presence control method according to claim 4, wherein the movement information item is timestamped by the monitoring device and/or wherein the presence information item is timestamped by the listening module.

17. The presence control method according to claim 16, wherein the step (EP1) for detecting the absence and/or the presence of at least one terminal in the communication network is performed in a repetitive manner according to a determined frequency.

18. The presence control method according to claim 17, wherein the step of sending (EP3) the presence information item is performed following the step (EP2) of creating and/or modifying a presence information item in a memory of the monitoring device or upon request from the processing unit or according to a defined time base.

19. The presence control method according to claim 18, further comprising a step (ECC1) of sending a feedback information item by the processing unit to a receiver terminal corresponding to a user profile referenced as a receiver in the memory of the processing unit, the feedback information item comprising an indication related to the movement information item and/or the presence information item and/or a result of the matching information item analysis according to the at least one irregularity determination criterion.

20. The presence control method according to claim 9, wherein the feedback information item and/or command and/or control information item transits via the router.

* * * * *